(12) United States Patent
Garland et al.

(10) Patent No.: US 10,040,580 B2
(45) Date of Patent: Aug. 7, 2018

(54) ROTATABLE ASSEMBLY

(71) Applicant: Airbus Defence and Space Limited, Hertfordshire (GB)

(72) Inventors: Martin Garland, Hertfordshire (GB); Stephen Bamford, Hertfordshire (GB); Carl White, Hertfordshire (GB)

(73) Assignee: AIRBUS DEFENCE AND SPACE LIMITED, Hertfordshire (GB)

( * ) Notice: Subject to any disclaimer, the term of this patent is extended or adjusted under 35 U.S.C. 154(b) by 203 days.

(21) Appl. No.: 14/900,992

(22) PCT Filed: Jun. 27, 2014

(86) PCT No.: PCT/EP2014/063767
§ 371 (c)(1),
(2) Date: Dec. 22, 2015

(87) PCT Pub. No.: WO2014/207239
PCT Pub. Date: Dec. 31, 2014

(65) Prior Publication Data
US 2016/0264265 A1    Sep. 15, 2016

(30) Foreign Application Priority Data
Jun. 27, 2013  (EP) .................................... 13275146

(51) Int. Cl.
*F16H 57/12*     (2006.01)
*B64G 1/22*      (2006.01)
(Continued)

(52) U.S. Cl.
CPC ............... *B64G 1/222* (2013.01); *B64G 1/24* (2013.01); *F16H 57/12* (2013.01); *H02K 7/116* (2013.01)

(58) Field of Classification Search
CPC ............... F16H 57/12; F16H 2057/121; F16H 2057/122; F16H 2057/123;
(Continued)

(56) References Cited

U.S. PATENT DOCUMENTS

| 2,880,625 | A | * | 4/1959 | Thomas | F16H 57/12 |
|   |   |   |   |   | 74/409 |
| 3,166,952 | A | * | 1/1965 | Lang | F16H 47/02 |
|   |   |   |   |   | 60/483 |

(Continued)

FOREIGN PATENT DOCUMENTS

| JP | H0432193 A | 11/1992 |
| WO | 0190599 A1 | 11/2001 |

OTHER PUBLICATIONS

International Search Report for corresponding application PCT/EP2014/063767 filed Jun. 27, 2014; dated Oct. 10, 2014.
(Continued)

*Primary Examiner* — Stacey Fluhart
(74) *Attorney, Agent, or Firm* — Cantor Colburn LLP

(57) ABSTRACT

The invention relates to a gear assembly (10) for use in a space craft for control of a moveable component thereof. The assembly comprises a load gear (11) in engagement with a drive gear (12) and an auxiliary gear (13). The drive gear (12) is coupled to a drive motor (14) so as to drive the load gear (11) in a first rotational direction. The auxiliary gear (13) is coupled to a retardation device (15) that is configured to passively resist the load gear (11) from rotating in the first rotational direction.

12 Claims, 10 Drawing Sheets

(51) Int. Cl.
*H02K 7/116* (2006.01)
*B64G 1/24* (2006.01)

(58) Field of Classification Search
CPC ......... F16H 2057/124; F16H 2057/125; F16H 2057/126; F16H 2057/128; F16H 2035/005; F16H 55/24
See application file for complete search history.

(56) References Cited

U.S. PATENT DOCUMENTS

| | | | | |
|---|---|---|---|---|
| 3,889,549 A | * | 6/1975 | Fieuzal | F16H 1/22 74/409 |
| 3,992,961 A | * | 11/1976 | Saito | F16H 57/12 74/409 |
| 5,265,488 A | * | 11/1993 | Yang | F16F 15/31 74/409 |
| 5,765,440 A | * | 6/1998 | Yang | F16H 55/24 74/409 |
| 5,769,748 A | | 6/1998 | Eyerly | |
| 6,724,113 B2 | * | 4/2004 | McVicar | F16H 57/12 310/112 |
| 8,511,192 B2 | * | 8/2013 | Hirtt | G05B 19/404 318/630 |
| 2004/0000829 A1 | | 1/2004 | McVicar | |
| 2006/0060026 A1 | * | 3/2006 | Hawkes | F16H 55/24 74/661 |
| 2007/0051847 A1 | | 3/2007 | Quitmeyer | |
| 2009/0115356 A1 | * | 5/2009 | Kawasoe | B60R 11/0235 318/48 |
| 2010/0096573 A1 | | 4/2010 | Min | |
| 2011/0138945 A1 | * | 6/2011 | Watanabe | F16H 57/12 74/409 |
| 2013/0312553 A1 | * | 11/2013 | Jan | F16H 57/12 74/89.17 |
| 2014/0053672 A1 | * | 2/2014 | Stillo | F16H 57/12 74/409 |

OTHER PUBLICATIONS

Written Opinion for corresponding application PCT/EP2014/063767 filed Jun. 27, 2014; dated Oct. 10, 2014.
Comments Submitted to the IB regarding Written Opinion for corresponding application PCT/EP2014/063767, dated Jun. 24, 2015.
Decision to grant a European patent pursuant to Article 97(1) EPC for corresponding application EP 13275146.2; dated Mar. 16, 2017.
Euroepan Search Report for corresponding application EP 13 275 146.2; Report dated Feb. 12, 2014.
European Patent Office Communication dated Mar. 3, 2016 for corresponding application EP 13 275 146.2.
European Patent Office Communication dated Jan. 8, 2015 for corresponding application EP 13275146.2.
Response dated Jul. 21, 2016 to European Patent Office Communication dated Mar. 3, 2016.
Response dated Jun. 24, 2015 to European Patent Office Communication of dated Jan. 8, 2015.

* cited by examiner

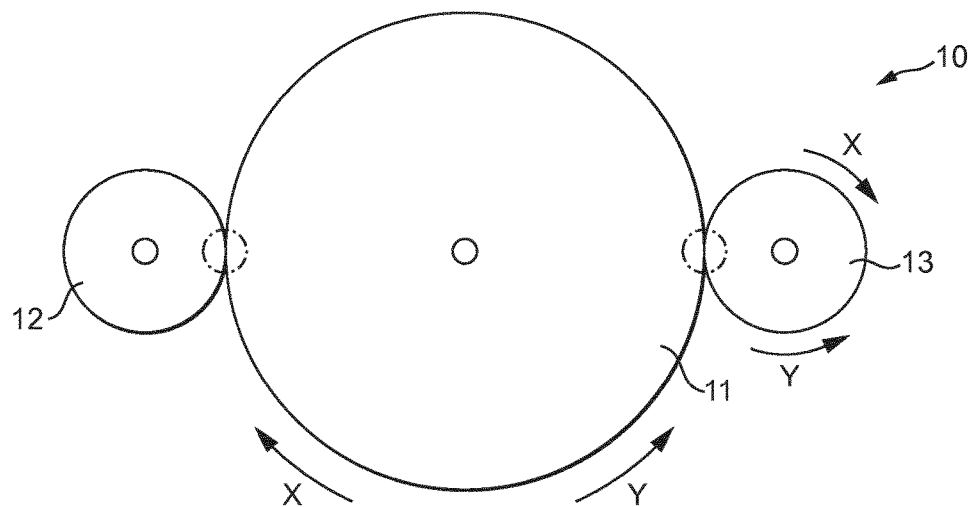
FIG. 4
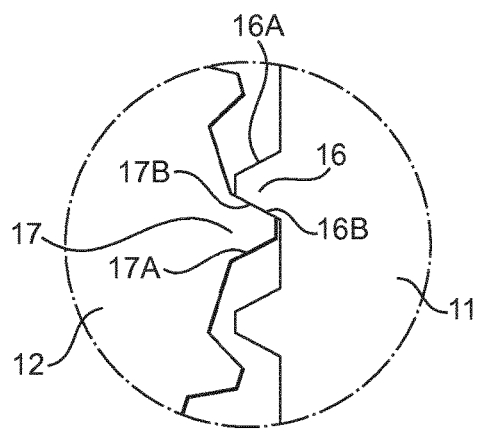 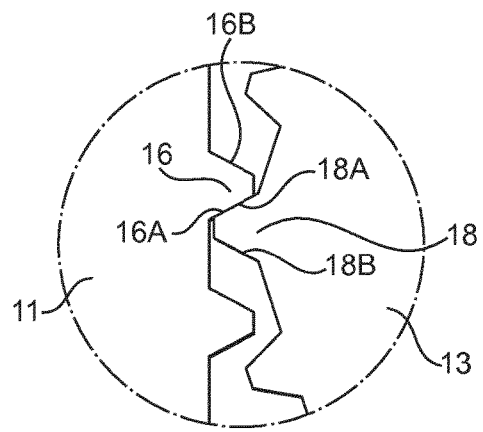
FIG. 4A   FIG. 4B

ROTATABLE ASSEMBLY

TECHNICAL FIELD

The present invention relates to a rotatable assembly for accurate rotational movement of a gear wheel and, in particular, such an assembly capable of incremental rotational movement with reduced backlash effects. The invention also relates to a structure comprising a rotatable assembly according to the invention.

BACKGROUND

Spacecraft, such as scientific and telecommunication satellites, include various instruments and devices that require deployment from the spacecraft in use, and/or require accurate positioning and realignment in use. For example, a satellite may comprise a deployable thermal radiator, an antenna on a boom or directly on the satellite structure that requires deployment, pointing and trimming in use, or a propulsion unit, mounted directly on the satellite or on a deployable boom, which requires accurate deployment and adjustment to provide spacecraft attitude control. It is therefore important that the driving mechanisms for such instruments and devices are capable of providing accurate control over their positioning for optimum operation, such as incremental rotational movement over small angles, or small deployment distance.

SUMMARY

Embodiments of the present invention provide a rotatable gear assembly for use in a space craft for control of a moveable component thereof, the assembly comprising a load gear in engagement with a drive gear and with an auxiliary gear, wherein the drive gear is coupled to a drive motor so as to drive the load gear in a first rotational direction and the auxiliary gear is coupled to a retardation device that is configured to passively resist the load gear from rotating in the first rotational direction.

The drive motor may be configured to incrementally rotate the drive gear between a plurality of discrete rotational positions, and may comprise a drive stepper motor.

The assembly may include at least one stepper motor, and may comprise at least two stepper motors coupled to the drive and auxiliary gears respectively, with each stepper motor having off-set detent positions relative to each other for a given position of the load gear.

The drive gear and the load gear respectively may have teeth in meshing engagement, and the load gear and the auxiliary gear may have teeth in meshing engagement, and wherein the rotatable assembly may be configured such that when the drive motor is in a discrete position, the load gear is held stationary by teeth of the drive gear and load gear abutting to exert a force on the load gear in one direction, and the teeth of the auxiliary gear and the load gear abutting to exert a force on the load gear in an opposite direction.

The drive motor may comprise a drive rotor that is incrementally rotatable between a plurality of discrete positions and the retardation device comprises a stepper motor that has a stepper rotor that is rotatable between a plurality of discrete detent positions, and wherein when the drive rotor is in a discrete position the stepper rotor is offset from its nearest detent position.

The stepper motor may be configured to generate a detent torque that urges the load gear in a second rotational direction opposite to the first rotational direction when the drive rotor is in a discrete position.

The stepper motor may comprise a stepper stator having a plurality of stepper stator poles and the stepper rotor comprises a plurality of stepper rotor poles, and wherein the detent torque is provided by magnetic attraction between the at least one stepper rotor pole and at least one stepper stator pole when the stepper motor is unpowered.

The detent positions of the stepper rotor may correspond to the positions in which a stepper rotor pole is proximate to a stepper stator pole.

When the drive rotor is in a discrete position the stepper rotor may be offset from its nearest offset position by an offset angle in the second rotational direction.

The offset angle may be between 0 percent and 50 percent of the angle between adjacent discrete positions of the drive rotor.

Backlash may be provided between the drive and load gears and may comprise the angle by which the load gear can rotate without corresponding movement of the drive gear, and the angle between adjacent discrete positions of the drive rotor may be greater than the angle of the backlash.

The stepper motor may be configured to be in an unpowered state when the drive motor drives the load gear.

The drive motor may be a first stepper motor and the retardation device may be a second stepper motor, and the assembly may be configured such that the second stepper motor is unpowered and provides detent torque on the load gear in a second, opposite direction when the first stepper motor drives the load gear in the first direction, and wherein the second stepper motor may be powered to drive the load gear in the second direction whilst the first stepper motor is unpowered and provides detent torque on the load gear in the first direction.

The retardation device may comprise a friction mechanism having a friction member that engages with the auxiliary gear to resist rotational movement of the auxiliary gear. Alternatively, the retardation device may comprise an eddy current brake that is configured to inhibit rotational movement of the auxiliary gear The rotatable assembly may comprise a second drive gear and a second auxiliary gear that each engage with the load gear, and the second drive gear may be coupled to a second drive motor that is configured to rotate the drive gear in a second rotational direction opposite the first rotational direction, and the second auxiliary gear may be coupled to a second retardation device that is configured to passively resist the load gear from rotating in said opposing rotational direction.

The second drive motor may comprise a second drive rotor that is rotatable in the second rotational direction between a plurality of discrete positions and the second retardation device may comprise a second stepper motor that has a second stepper rotor that is rotatable between a plurality of discrete detent positions, and when the second drive rotor is in a discrete position the second stepper rotor may be offset from its nearest detent position.

The rotatable assembly may further comprise third and fourth auxiliary gears that are coupled to third and fourth stepper motors respectively that comprise third and fourth stepper rotors that are rotatable between a plurality of detent positions, and the third and fourth stepper rotors may be offset from their respective detent positions when the first and second drive rotors are each in a discrete position.

The rotatable assembly may further comprise third and fourth auxiliary gears that are coupled to third and fourth drive motors respectively that are configured to rotate the load gear in the first and second rotational directions respectively The present invention also provided a space craft structure comprising a moveable component coupled to, and controlled by, a rotatable assembly according to any preceding claim.

The rotational assembly of the invention generally comprises a gear assembly, and may comprise a modular assembly having a chassis, the load gear, drive gear(s) and auxiliary gear(s) being mounted to the chassis. The drive motor(s) and stepper motor(s), and their associated gears, may be individually attachable to, and detachable from, assembly. The load gear may be coupled to a moveable component of a space vehicle, such as an antenna, or a deployable boom/thruster, to provide precise deployment, trimming and attitude control thereof. Alternatively, the device may comprise a deployable thermal radiator or propulsion pointing system, e.g. for providing orbit and attitude control to a spacecraft.

The load gear may comprise a central spur gear and the or each drive gear and auxiliary gear may comprise pinion gears peripheral to the spur gear. The load gear may be of a larger diameter than the drive gear(s) and/or auxiliary gear(s). This advantageously provides finer rotational control of the load gear and, thereby, any moveable component or mechanism coupled thereto.

The rotatable assembly may further comprise a controller to control operation of the drive motor. The controller may also control power to drive motor, and to the stepper motor(s)/drive motor(s).

The rotatable assembly may also include a positional sensor coupled to load gear to detect a position thereof, and to feedback positional data. The positional data may be fed to the controller to determine and enable control drive motor, and/or the stepper motor(s).

BRIEF DESCRIPTION OF THE DRAWINGS

Embodiments of the present invention will now be described, by way of example only, with reference to the accompanying drawings, in which:

FIG. 4 is a schematic view of a rotatable assembly according to a first embodiment of the invention;

FIG. 4A is a close-up view of part of the rotatable assembly of FIG. 4;

FIG. 4B is a close-up view of part of the rotatable assembly of FIG. 4;

DETAILED DESCRIPTION

Figure 1:
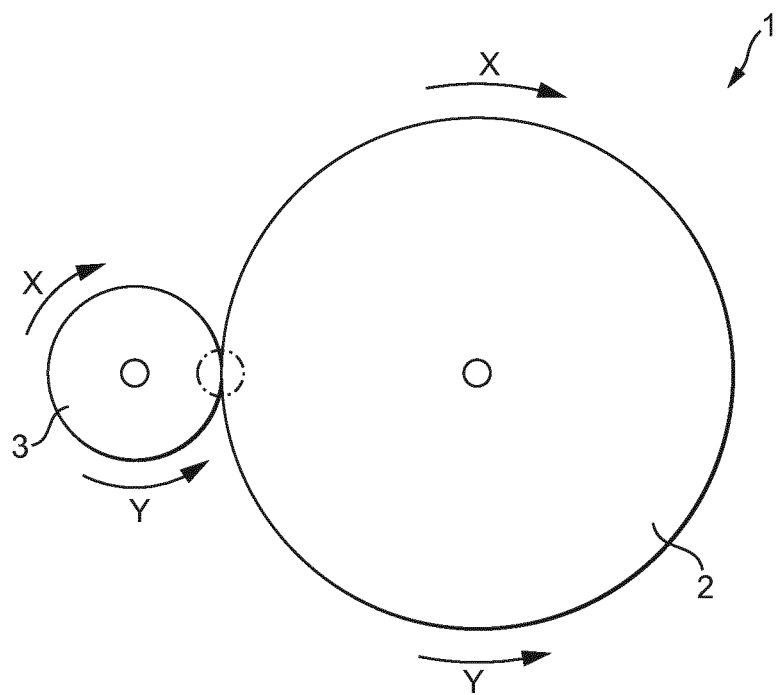
FIG. 1 is a schematic view of a known rotatable assembly.

A rotatable assembly 1 of a known configuration is shown in FIGS. 1 to 3A and comprises a spur gear 2 that is mechanically coupled to a load (not shown) and a pinion gear 3 that is driven by a motor (not shown). The spur and pinion gears 2, 3 are in meshing engagement and each is rotatable in a first and a second rotational direction (shown by arrows 'X' and 'Y' in FIG. 1). It will be appreciated that due to the meshing engagement of the spur and pinion gears 2, 3, the spur gear 2 rotates in the first direction X when the pinion gear 3 rotates in the second direction Y, and vice versa.

The spur gear 2 has a plurality of spur teeth 4 that each has first surface 4A that faces in the first rotational direction X and a second surface 4B that faces in the second rotational direction Y. Similarly, the pinion gear 3 has a plurality of pinion teeth 5 that each has a first surface 5A that faces in the first rotational direction X and a second surface 5B that faces in the second rotational direction Y. The spur and pinion teeth 4, 5 engage so that the pinion gear 3 drives the spur gear 2.

Figure 1A:
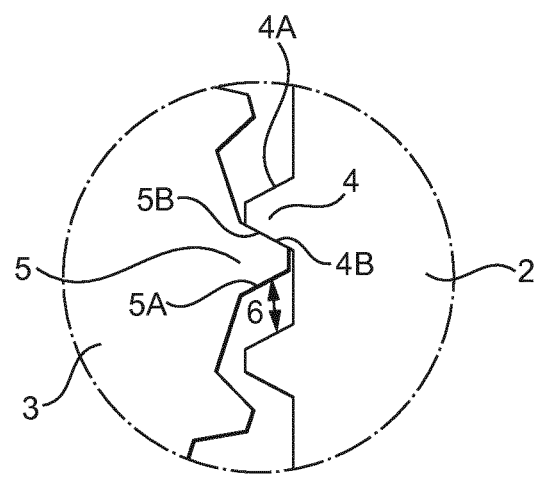
FIG. 1A is a close-up view of part of the rotatable assembly of FIG. 1.

When the motor is powered to drive the pinion gear 3, a surface 5A, 5B of one of the pinion teeth 5 will engage with a surface 4A, 4B of one of the spur teeth 4. For example, when the pinion gear 3 is driven by the motor in the second rotational direction Y (as shown in FIGS. 1 and 1A), the second surface 5B of one of the pinion teeth 5 will be urged against the second surface 4B of one of the spur teeth 4. Therefore, the second surface 5B of the pinion tooth 5 applies a force to the second surface 4B of the spur tooth 4, causing torque to be transferred to the spur gear 2 from the motor so that the spur gear 2 rotates in the first rotational direction X.

Figure 2:
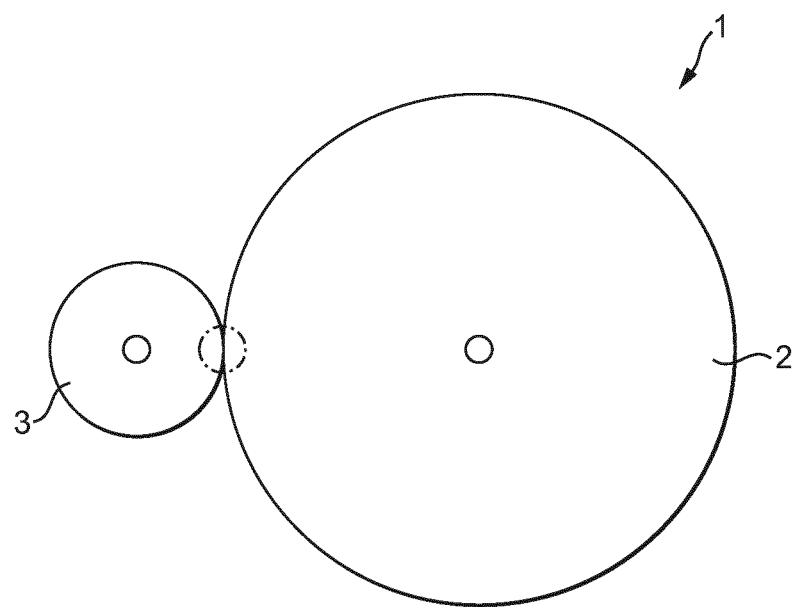
FIG. 2 is a schematic view of the rotatable assembly of FIG. 1, in a second rotational position.
Figure 2A:
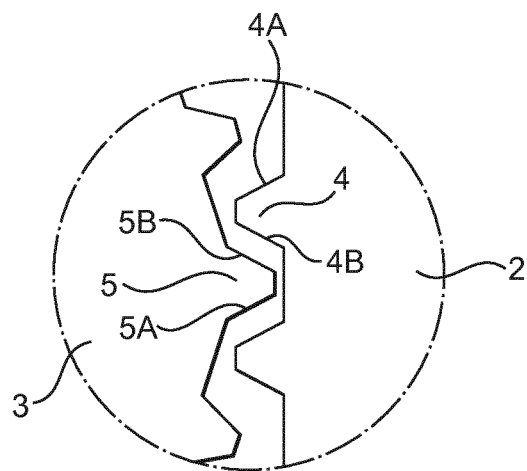
FIG. 2A is a close-up view of part of the rotatable assembly of FIG. 2.
Figure 3:
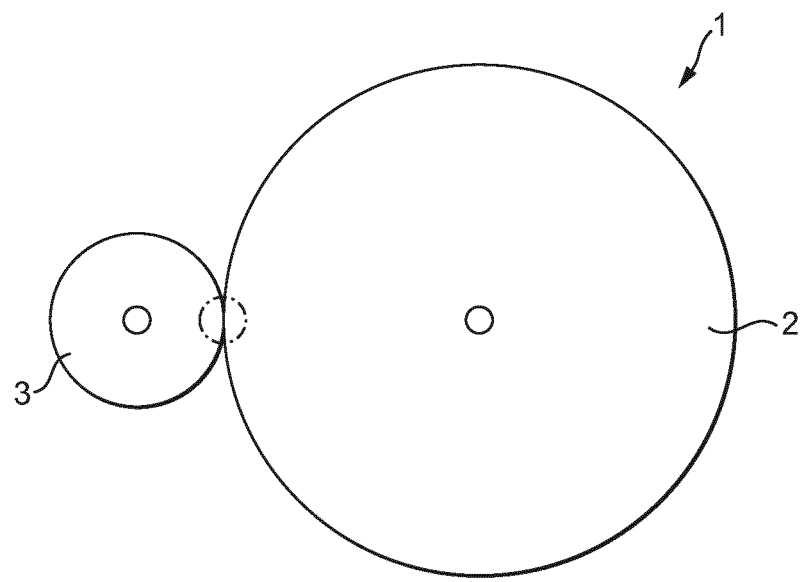
FIG. 3 is a schematic view of the rotatable assembly of FIG. 1, in a third rotational position.
Figure 3A:
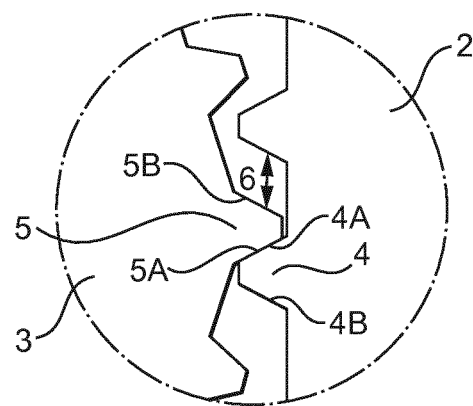
FIG. 3A is a close-up view of part of the rotatable assembly of FIG. 3.

The rotational direction of the spur gear 2 may be reversed by reversing the direction of the pinion gear 3, which will result in the currently engaged pinion tooth 5 disengaging with the currently engaged spur tooth 4 and then engaging with an adjacent tooth 4 of the spur gear 2. For instance, if in the above example (shown in FIGS. 1 and 1A) the pinion gear 3 is then driven in the first rotational direction X, the second surface 5B of the engaged pinion tooth 5 will move away from the second surface 4B of the engaged spur tooth 4 (as shown in FIGS. 2 and 2A). The pinion gear 3 will then rotate in the first rotational direction and the first surface 5A of the previously engaged pinion tooth 5 will engage with the first surface 4A of an adjacent spur tooth 4, applying a force to the spur tooth 4 so that the spur gear 2 rotates in the second rotational direction Y (as shown in FIGS. 3 and 3A).

A gap 6 is provided between the engaged pinion tooth 5 and the nearest disengaged spur tooth 4. For instance, in the above example, when the pinion gear 3 rotates in the second rotational direction Y (as shown in FIGS. 1 and 1A) the gap 6 is formed between the first surface 5A of the engaged pinion tooth 5 and the first surface 4A of the adjacent disengaged spur tooth 4. Similarly, when the pinion gear 3 rotates in the first rotational direction X (as shown in FIGS. 3 and 3A) the gap 6 is formed between the second surface 5B of the engaged pinion tooth 5 and the second surface 4B of the adjacent disengaged spur tooth 4. The gap 6 may be intentionally introduced between the gears 2, 3 to allow for lubrication to reach all parts of the surface of the gear teeth 4, 5. Alternatively, the gap between the gears 2, 3 may be an unavoidable consequence of manufacturing tolerances, thermal expansion, allowances, or deflection of the gears due to loading.

If an external torque is applied to the spur gear 2 in the same direction that the spur gear 2 is driven by the pinion gear 3, the currently engaged spur tooth 4 may become disengaged from the currently engaged pinion tooth 5 and freely rotate until said spur tooth 4 engages with an adjacent pinion tooth 5. The maximum angle that the pinion 3 can rotate by without the spur 2 due to the gap between the gears 2, 3 is known as 'play' or 'backlash'. The backlash between the gears 2, 3 can result in the gear system being unresponsive, as the spur gear 2 will not immediately rotate in response to a movement of the pinion gear 3 if the spur and pinion teeth 4, 5 are not engaged. Furthermore, the backlash can result in the precise rotational displacement of the spur gear 2 being unknown, which can introduce positional error into the system. Furthermore, the spur gear 2 may continue to rotate after the pinion gear 3 has stopped rotating due to inertial effects.

Referring to FIGS. 4-6C, a rotatable assembly 10 of a first embodiment of the invention is shown and comprises a load gear n that is engaged with a drive gear 12 and an auxiliary gear 13. The load, drive and auxiliary gears 11, 12, 13 are each rotatable in a first rotational direction (shown by arrow 'X' in FIG. 4) and a second rotational direction (shown by arrow 'Y' in FIG. 4). The load gear 11 is coupled to a load (not shown), for example, a load in a spacecraft application such as a deployable thermal radiator, an electronic propulsion system pointing mechanism, or an antenna deployment/pointing/trimming mechanism, either directly connected or as part of a deployable boom structure. The drive gear 12 is coupled to a first stepper motor 14 that is configured to incrementally rotate the load gear 11 in the first rotational direction X by driving the drive gear 12 in the second rotational direction Y.

The load gear 11 has a plurality of load teeth 16 that each has a first surface 16A that faces in the first rotational direction X and second surface 16B that faces in the second rotational direction Y. Similarly, the drive gear 12 has a plurality of drive teeth 17 that each has a first surface 17A that faces in the first rotational direction X and a second surface 17B that faces in the second rotational direction Y and the auxiliary gear 13 has a plurality of auxiliary teeth 18 that each has a first surface 18A that faces in the first rotational direction X and a second surface 18B that faces in the second rotational direction Y.

The first stepper motor 14 comprises a stator 20 that is arranged around the rotational axis of a permanent magnet rotor 21 comprising a north pole N and a south pole S. The stator 20 comprises first, second, third and fourth windings 22A, 22B 22C, 22D that are arranged around the rotor 21 so that they diametrically oppose fifth, sixth, seventh and eighth windings 23A, 23B, 23C, 23D respectively. The first and fifth 22A, 23A windings comprise a first pole pair, the second and sixth windings 22B, 23B comprise a second pole pair, the third and seventh windings 22C, 23C comprise a third pole pair, and the fourth and eighth windings 22D, 23D comprise a fourth pole pair. Each stator winding 22A, 22B 22C, 22D, 23A, 23B, 23C, 23D comprises wire that is wrapped around a ferromagnetic core so as to generate a magnetic field when energised with current. Corresponding stator windings 22A, 22B, 22C, 22D, 23A, 23B, 23C, 23D of each pole pair are electrically connected together and are also connected to opposing potential terminals of a power supply. The windings of each pole pair are wound in opposite directions so that the windings of each pole pair will have an opposing magnetic polarity when the power supply is switched on.

Figure 5A:
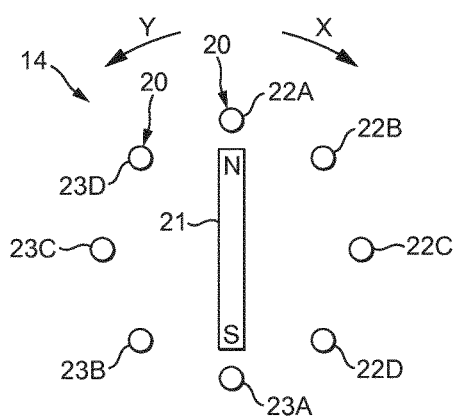
FIG. 5A is a schematic view of a first stepper motor of the first embodiment of the invention, in a first position.
Figure 6A:
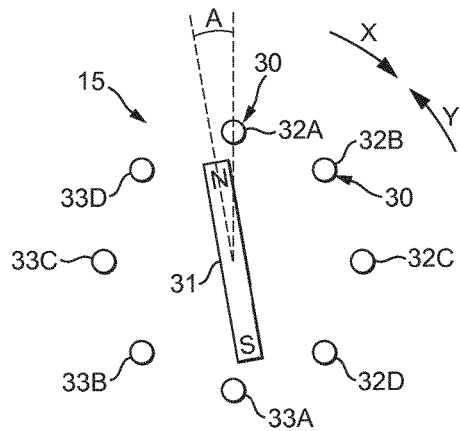
FIG. 6A is a schematic view of a second stepper motor of the first embodiment of the invention, in a first position.
Figure 5B:
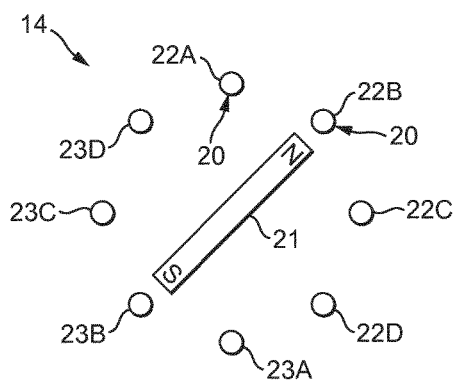
FIG. 5B is a schematic view of the first stepper motor of the first embodiment of the invention, in a second position.
Figure 6B:
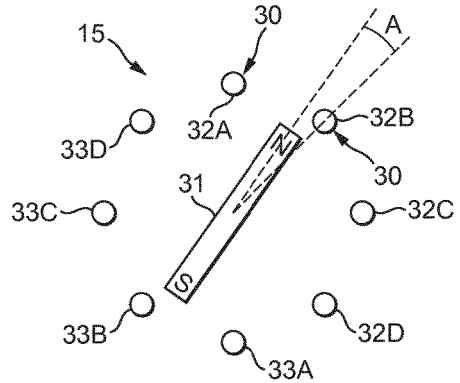
FIG. 6B is a schematic view of the second stepper motor of the first embodiment of the invention, in a second position.
Figure 5C:
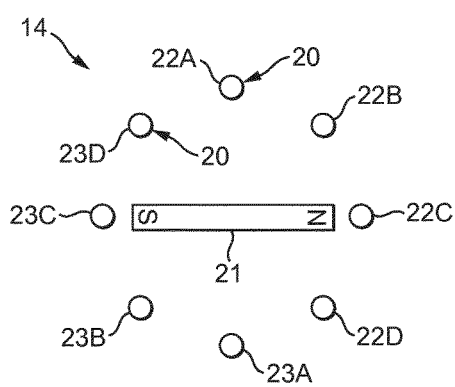
FIG. 5C is a schematic view of the first stepper motor of the first embodiment of the invention, in a third position.
Figure 6C:
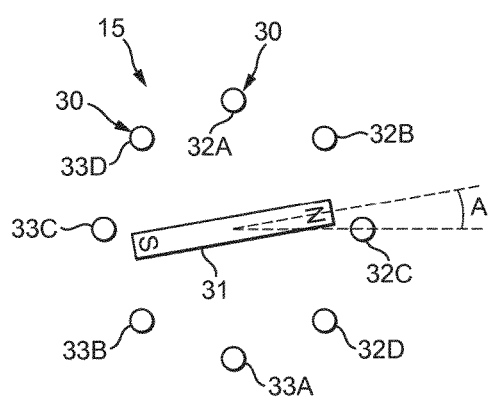
FIG. 6C is a schematic view of the second stepper motor of the first embodiment of the invention, in a third position.
Figure 7:
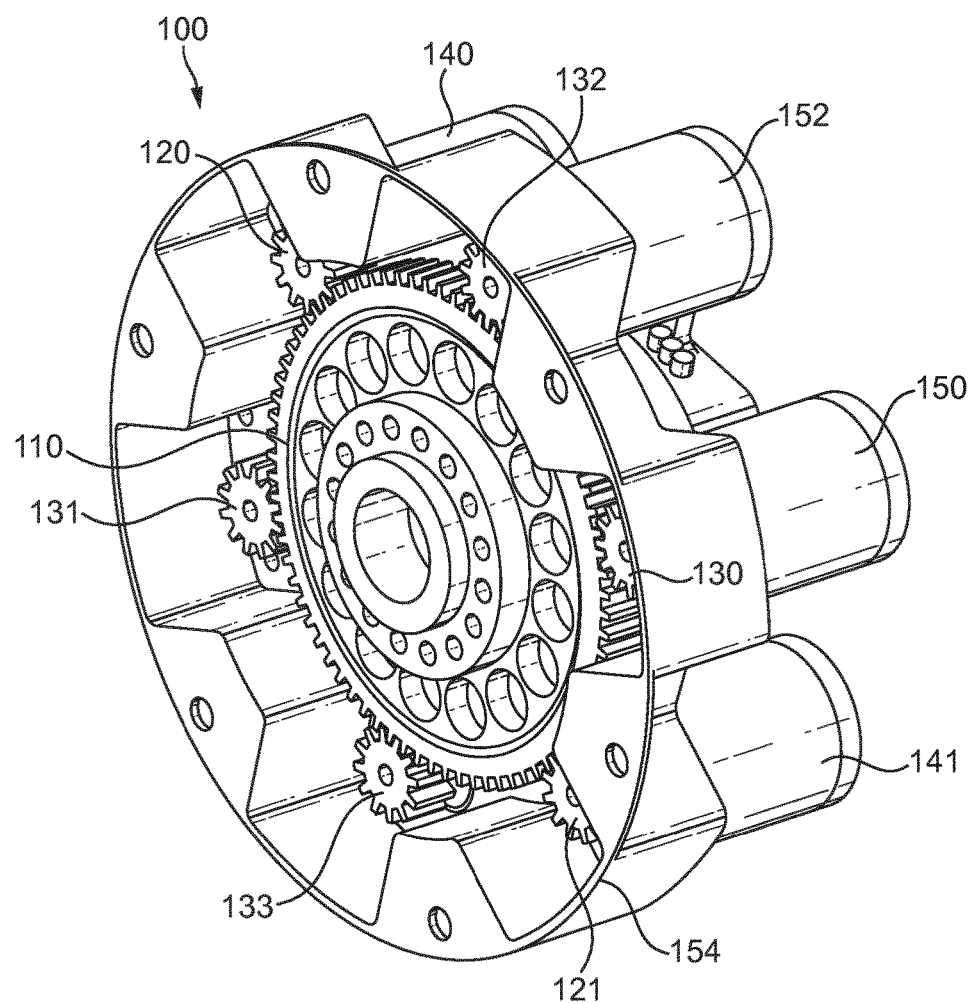
FIG. 7 is a perspective view of the rotatable assembly of a second embodiment.
Figure 8:
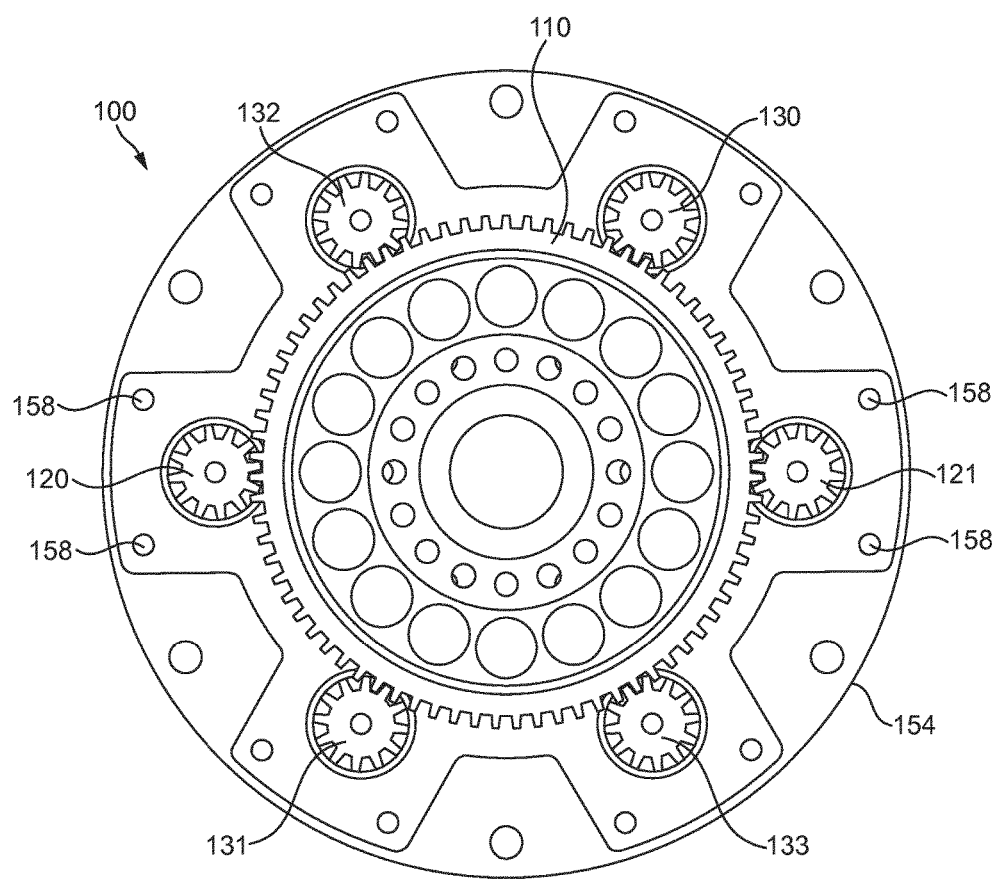
FIG. 8 is an end view of the rotatable assembly of FIG. 7.
Figure 9:
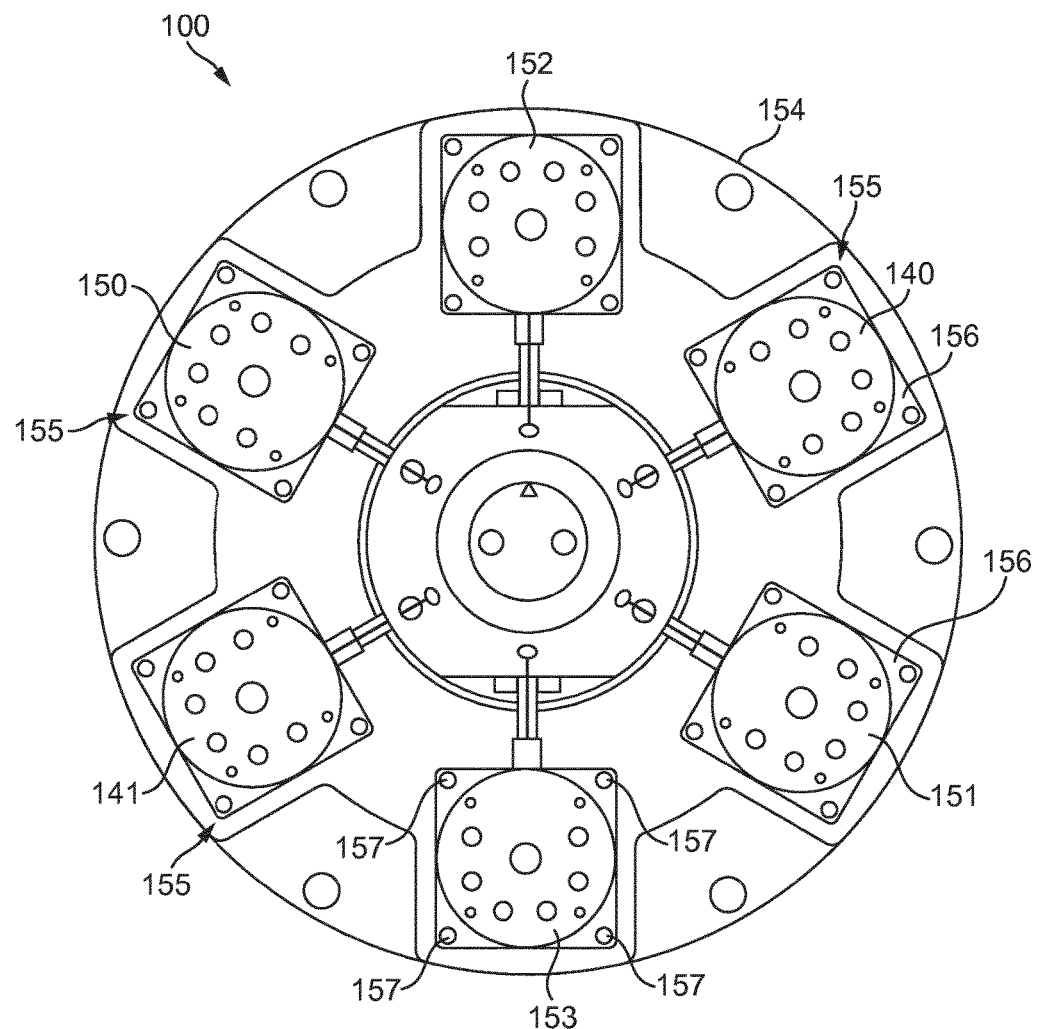
FIG. 9 is a second end view of the rotatable assembly of FIG. 7.
Figure 10:
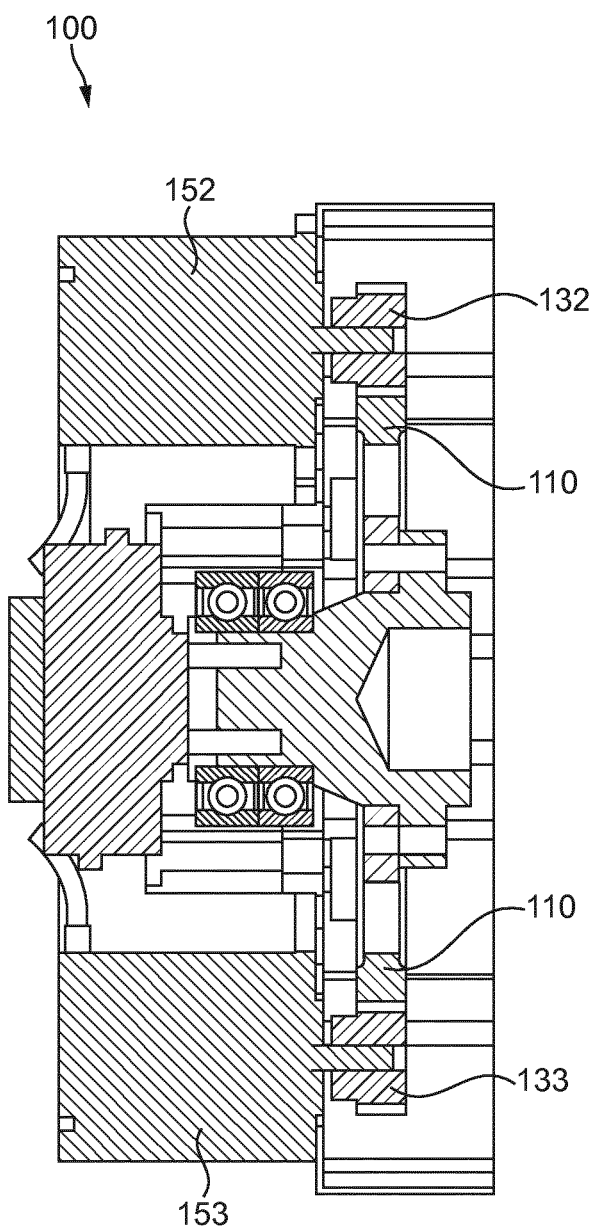
FIG. 10 is a cross-sectional side view of the rotatable assembly of FIG. 7.
Figure 11:
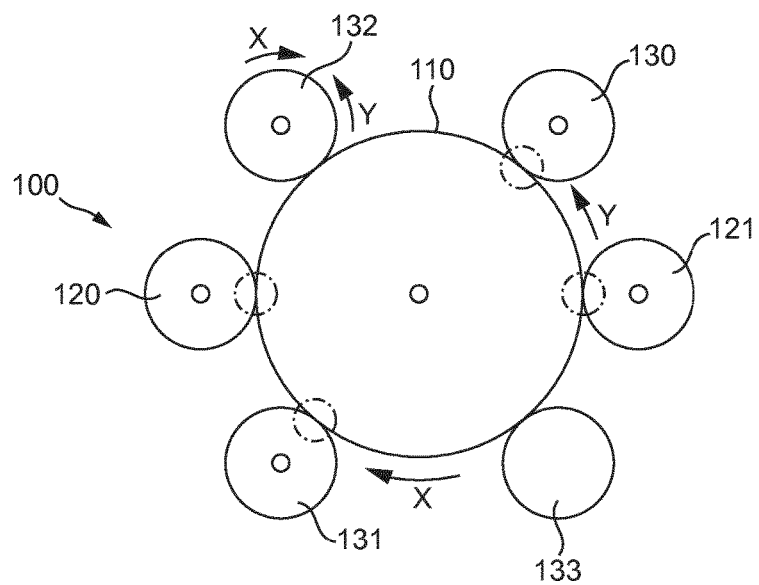
FIG. 11 is a schematic view of a portion of the rotatable assembly of FIG. 7.
Figure 11A:
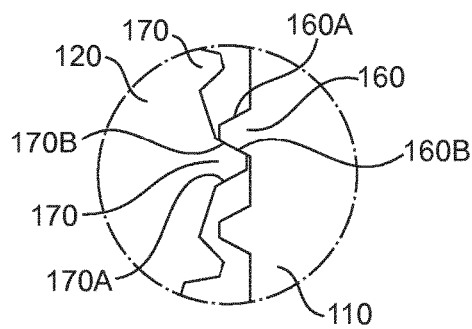
FIG. 11A is a close-up view of part of the rotatable assembly of FIG. 11.
Figure 11B:
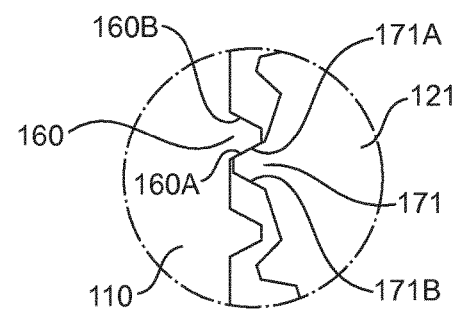
FIG. 11B is a close-up view of part of the rotatable assembly of FIG. 11.
Figure 11C:
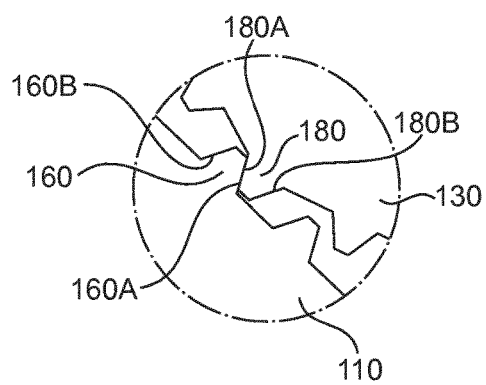
FIG. 11C is a close-up view of part of the rotatable assembly of FIG. 11.
Figure 11D:
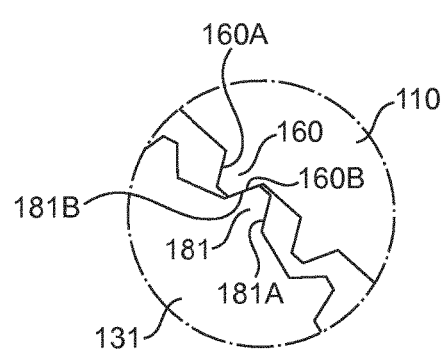
FIG. 11D is a close-up view of part of the rotatable assembly of FIG. 11.

The pole pairs are energised sequentially to incrementally rotate the rotor 21 through 360 degrees relative to the stator 20 between eight discrete 'holding' positions. For example, when the first pole pair is energised so that the first winding 22A is connected to the positive terminal of the power supply and the fifth winding 23A is connected to the negative terminal, the first winding 22A will have a South pole polarity and the fifth winding 23A will have a North pole polarity. In such a circumstance, the North pole N of the rotor 21 will be magnetically attracted to the first stator winding 22A and the South pole S of the rotor 21 will be magnetically attracted to the fifth stator winding 23A. This magnetic attraction results in a force being exerted on the rotor 21 that causes it to rotate until the rotor is in a position in which the North pole of the rotor 21 lies adjacent to the first stator winding 22A and the South pole of the rotor 21 lies adjacent to the fifth stator winding 23A so that the rotor 21 is in a first holding position (as shown in FIG. 5A). If the second pole pair is then energised so that the second winding 22B is connected to the positive terminal of the power supply and the sixth winding 23B is connected to the negative terminal, the second winding 22B will have a South pole polarity and the fifth winding 23B will have a North pole polarity. In such a circumstance, the North pole N of the rotor 21 will be magnetically attracted to the second stator winding 22B and the South pole S of the rotor 21 will be magnetically attracted to the sixth stator winding 23B and so the rotor will rotate in the first rotational direction so that rotor moves to a second holding position (as shown in FIG. 5B) in which the North pole N of the rotor lies adjacent to the fifth stator winding 23B and the South pole S lies adjacent to the sixth stator winding 23B. The rotor 21 may then be rotated in the first rotational direction to a third holding position, wherein the North and South poles N, S of the rotor 21 lie adjacent to the third and seventh stator windings 22C, 23C respectively, by energising the third pole pair so that the third stator winding 22C is connected to the positive terminal and the fifth stator winding 23C is connected to the negative terminal of the power supply. The rotor 21 may then be rotated in the first rotational direction into a fourth holding position, wherein the North and South poles N, S of the rotor 21 lie adjacent to the fourth and eighth stator windings 22D, 23D respectively, by energising the fourth pole pair so that the fourth stator winding 22D is connected to the positive terminal and the sixth stator winding 23D is connected to the negative terminal of the power supply.

To continue rotating the rotor 21 in the first rotational direction, the first pole pair is then energised by connecting the second winding 22B to the negative terminal of the power supply and the sixth winding 23B to the positive terminal so that the second winding 22B will have a North pole polarity and the fifth winding 23B will have a South pole polarity. In such a circumstance, the North pole N of the rotor 21 will be attracted to the fifth stator winding 23A and the South pole S of the rotor 21 will be attracted to the first stator winding 22A, which causes the rotor 21 to rotate until it is in a position in which the North pole N of the rotor 21 lies adjacent to the fifth stator winding 23A and the South pole S lies adjacent to the first stator winding 22A so that the rotor 21 is in a fifth holding position. In a similar manner, the rotor 21 may be rotated to sixth, seventh and eight holding positions in which the North pole N of the rotor 21 lies adjacent to the sixth, seventh and eighth stator windings 23B, 23C, 23d respectively and the South pole S of the rotor 21 lies adjacent to the second, third and fourth stator windings 22B, 22C, 22D respectively. The direction of rotation is reversible by energising the pole pairs in the reverse order to that described above. Thus, the first stepper motor 14 has a step size of 45 degrees, with the rotor 21 being rotatable in the first and second rotational directions between the eight discrete holding positions.

When the first stepper motor 14 is powered to drive the drive gear 12, a surface 17A, 17B of one of the drive teeth 17 will engage with an opposing surface 16A, 16B of one of the load teeth 16. For example, when the drive gear 12 is driven by the motor in the second rotational direction (as shown in FIGS. 4-4B), the second surface 17B of one of the drive teeth 17 will be urged against the second surface 16B of one of the load teeth 16. Therefore, the second surface 17B of the drive tooth 17 applies a force to the second surface 16B of the load tooth 16, causing torque to be transferred from the motor to the load gear 11 so that the load gear 11 rotates in the first rotational direction.

To reduce the effects of backlash, the auxiliary gear 13 is coupled to a second stepper motor 15. Similarly to the first stepper motor 14, the second stepper motor 15 comprises a stator 30 that is arranged around the rotational axis of a permanent magnet rotor 31 comprising a north pole N and a south pole S. The stator 30 comprises first, second, third and fourth windings 32A, 32B 32C, 32D that are arranged around the rotor 31 so that they diametrically oppose fifth, sixth, seventh and eighth windings 33A, 33B, 33C, 33D respectively. The first and fifth 32A, 33A windings comprise a first pole pair, the second and sixth windings 32B, 33B comprise a second pole pair, the third and seventh windings 32C, 33C comprise a third pole pair, and the fourth and eighth windings 32D, 33D comprise a fourth pole pair.

Each stator winding 32A, 32B 32C, 32D, 33A, 33B, 33C, 33D of the second stepper motor 15 comprises wire that is wrapped around a ferromagnetic core. However, unlike the first stepper motor 14, the second stepper motor 15 is unpowered during operation of the first stepper motor 14 and so the windings are not energised with current.

Despite the windings not being energised, the permanent magnet rotor 31 will still be attracted to the ferromagnetic material of the windings. Therefore, the North and South poles N, S of the rotor 31 will be urged towards respective windings of the nearest pole pair, resulting in a torque being exerted on the rotor 31 known as a 'detent torque'. The rotor is rotatable between first to eighth detent positions wherein the North pole N of the rotor 31 is proximate to the first, second, third, fourth, fifth, sixth, seventh and eighth stator windings 32A, 32B, 32C, 32D, 33A, 33B, 33C, 33D respectively and the South pole S is proximate to the fifth, sixth, seventh, eighth, first, second, third and fourth stator windings 33A, 33B, 33C, 33D, 32A, 32B, 32C, 32D respectively. The detent torque results in the rotor 31 being urged towards its closest detent position.

The first to eighth detent positions of the second stepper motor 15 are in 45 degree increments, as with the first to eighth holding positions of the first stepper motor 14. However, the rotor 31 of the second stepper motor 15 is rotationally offset from the rotor 21 of the first stepper motor 14 by an offset angle A. It has been found that an offset angle A that is 10 percent of the step size of the first stepper motor 15 is effective at reducing backlash, and so in the present embodiment the offset angle A is 4.5 degrees. Therefore, when the rotor 21 of the first stepper motor 14 is in one of its holding positions, the rotor 31 of the second stepper motor 15 will be offset from its nearest detent position by 4.5 degrees and urged towards said detent position by the detent torque acting on the rotor 31.

The rotor 31 of the second stepper motor 15 is offset from the rotor 21 of the first stepper motor 14 by offset angle A in the second rotational direction so that when the rotor 21 of the first stepper motor 14 is in a holding position, the detent torque urges the auxiliary gear 13 in the first rotational direction, which opposes the direction that the first stepper motor 14 drives the drive gear 12. The detent torque of the second stepper motor 15 will be transferred to the load gear 11, via the auxiliary gear 13, to urge the load gear 11 in the second rotational direction so that the engaged tooth 16 of the load gear 11 is urged against the engaged tooth 17 of the drive gear 12. Therefore, when the first stepper motor 14 is in a holding position, the load gear 11 is prevented from rotating in the first rotational direction under external forces, which could otherwise result in the engaged teeth 16, 17 becoming disengaged, and so the effects of backlash between the gears 11, 12 are reduced. For example, as the teeth 16, 17 are kept engaged, a torque can more instantaneously be applied to the load gear 11 by the drive gear 12, and the rotational position of the load gear 11 is better known. Furthermore, the holding torque of the system is improved. Additionally, even in the event that an external force is applied to the load gear 11 that is sufficient to overcome the detent torque of the second stepper motor 15 so that the teeth 16, 17 of the load and drive gears 11, 12 are no longer engaged and a gap forms therebetween, the gap between the disengaged teeth 16, 17 will still be reduced by the force of the detent torque that is transferred to the load gear 11.

Although in the above described embodiment the first stepper motor 14 is described as operating in a 'full-step, single phase' mode of operation, wherein only the windings of one pole pair are energised at a time, it should be recognised that stepper motors operating in other modes are intended to fall within the scope of the invention. For example, in one embodiment the first stepper motor 14 may alternatively be operated in a 'full-step, dual phase' mode of operation, wherein the adjacent pole pairs are energised simultaneously so that the rotor 21 moves between holding positions that are half-way between said pole pairs. In another embodiment, the first stepper motor 14 is operated in a 'half-step' mode of operation, wherein the motor is alternated between single-phase and dual-phase operation so that a first pole pair is energised, then the first and an adjacent second pole pair are energised, and then just the second pole pair is energised and then the second pole pair and an adjacent third pole pair are energised, and so forth. In yet another embodiment, the first stepper motor 14 may be micro-stepped. In all of the above-described embodiments, the rotor 31 of the second stepper motor 15 is configured so that it is offset from its nearest detent position when the first stepper motor 14 is in a holding position.

Although in the above described embodiment the first stepper motor has a step size of 45 degrees, having eight discrete holding positions, in alternate embodiments the first stepper motor 14 may have any number of different step sizes, for example, 90 degrees, having 4 discrete holding positions, 5 degrees, having 72 discrete holding positions, or 1.8 degrees, having 200 discrete holding positions. Similarly, it should be recognised that the second stepper motor having any number of different step sizes is intended to fall within the scope of the invention. For example, the second stepper motor 15 may have 4 detent positions, 72 detent positions or 200 detent positions. In one embodiment, the step size of the first stepper motor 14 is greater than the rotational angle of the gear backlash, which is the angle that the load gear 11 could freely rotate due to the gap between the gears if the auxiliary gear 13 and second stepper motor 15 was not provided. Such an embodiment prevents the first stepper motor 14 from becoming desynchronised if an external torque is applied to the load gear 11 in the first rotational direction that is of sufficient magnitude to overcome the detent torque provided by the second stepper motor 15, which may otherwise result in the first stepper motor 14 rotating between holding positions in the first rotational direction without any corresponding rotation of the load gear 11 due to a gap forming between the teeth of the load and drive gears 11, 12. Desynchronisation of the first stepper motor 14 and the load gear 11 may result in a lag between the first stepper motor 14 being powered and the load gear 11 subsequently rotating and may result in the rotational position of the load gear 11 becoming unknown.

As the drive and auxiliary gears 12, 13 each have the same gear ratio with respect to the load gear 11, the rotors 12, 13 of the first and second stepper motors 14, 15 will rotate by the same angle for any given angle of rotation of the load gear 11. Therefore, if the first stepper motor 14 has the same number of holding positions that the second stepper motor 15 has detent positions, for example, by having stators with the same number of windings and rotors with the same number of magnetic poles, then the rotor 31 of the second stepper motor 15 can be offset from the rotor 21 of the first stepper motor 14 by the same offset angle, and in the same rotational direction, regardless of which holding position the rotor 21 of the first stepper motor 14 is in.

The second stepper motor 15 does not need to be powered to provide the detent torque to urge a tooth of the auxiliary gear 13 against a tooth of the load gear 11, and so the second stepper motor 15 acts as a passive device, requiring no power or active electronics to provide a rotational retardation force in an opposite direction to the driving direction of the drive gear 12 to alleviate the effects of backlash.

Although in the above described embodiment the first and second stepper motors 14, 15 have the same stator winding and rotor configurations to ensure that the rotor 31 of the second stepper motor 15 is offset by offset angle A for all holding positions of the rotor 21 of the first stepper motor 14, in alternate embodiments (not shown) this effect may be achieved by using stepper motors with different rotor/stator configurations. For example, in one embodiment the first stepper motor comprises a stator with eight windings and a rotor with one north and one south pole and the second stepper motor comprises a stator with eight windings and a rotor with two north and two south poles. In another embodiment, the first stepper motor comprises a stator with four windings and a rotor with one north and one south pole and the second stepper motor comprises a stator with eight windings and a rotor with one north and one south pole.

Furthermore, although in the above described embodiment the drive and auxiliary gears have the same gear ratios with respect to the load gear, in alternate embodiments backlash may still be reduced when the first stepper motor is in any of its holding positions using drive and auxiliary gears with different gear ratios. For example, in one embodiment the drive gear and load gear have a gear ratio of 4:1 and the auxiliary gear and load gear have a gear ratio of 8:1. In another embodiment, the drive gear and load gear have a gear ratio of 4:1 and the auxiliary gear and load gear have a gear ratio of 8:1 and the first stepper motor has a stator with eight windings and a rotor with one north and one south pole and the second stepper motor has a stator with four windings and a rotor with one north and one south pole. In such an embodiment, the rotor of the second stepper motor will move twice the angle of the first stepper motor for a given angle of rotation of the load gear, and so the second stepper motor will be offset from its detent position by the same angle when the rotor of the first stepper motor is in any of its holding positions, despite the second stepper motor having fewer detent positions than the first stepper motor has holding positions. It should be recognised that the above examples of combinations of load, drive and auxiliary gear ratios and first and second stepper motor configurations are non-exhaustive and other combinations are intended to fall within the scope of the invention, provided that the detent position of the rotor is of the second stepper motor is offset from its detent position when the first stepper motor is in at least one of its holding positions.

Although in the above described embodiment the core of the stator windings comprises a ferromagnetic material, in an alternate embodiment (not shown) the wire of the stator windings may comprise a ferromagnetic material.

Although in the above described embodiment the rotor 21 of the first stepper motor 14 comprises a permanent magnet and the stator 20 comprises windings that are energised to magnetically attract the rotor, in an alternate embodiment (not shown) the stator may comprise one or more permanent magnets and the rotor comprises windings that are energised to rotate the rotor between a plurality of holding positions. In yet another embodiment, the stator and the rotor both comprise windings that are energised to rotate the rotor between a plurality of holding positions.

Although in the above described embodiment the stator 30 of the second stepper motor 15 comprises a ferromagnetic windings and the rotor 31 comprises a permanent magnet that is magnetically attracted to the ferromagnetic material of the stator windings to generate detent torque, in an alternate embodiment (not shown) the stator may comprise one or more permanent magnets and the rotor comprises ferromagnetic windings and the detent torque is generated by the ferromagnetic material of the windings of the rotor being magnetically attracted to the permanent magnet material of the stator.

Although in the above described embodiment the offset angle A of the second stepper motor 15 is 10 percent of the step size of the first stepper motor 14, in alternate embodiments the offset angle A of the second stepper motor 15 may be between 0 and 50 percent of the step size of the first stepper motor 14.

Although in the above described embodiment the passive retardation device comprises a stepper motor 15 having a detent torque that prevents the load gear 11 from rotating under external forces and therefore increases the holding torque of the rotatable assembly, in an alternate embodiment (not shown) the passive retardation device is omitted and is replaced with an alternative passive retardation device comprising a friction mechanism. The friction mechanism comprises a friction member that is urged against a surface of the auxiliary gear 13 to inhibit rotation of the auxiliary gear 13. When the an external force is exerted on the load gear 11 to urge it to rotate in the first rotational direction, a tooth 16 of the load gear 11 is urged against a tooth 18 of the auxiliary gear 13 so that the auxiliary gear 13 is urged to rotate in the second rotational direction. However, the friction member inhibits rotation of the auxiliary gear 13 and so the load gear 11 is prevented from rotating in the first rotational direction when the external force applied thereto, and so the holding torque of the rotatable assembly is increased. The holding torque of the rotatable assembly may be increased by increasing the force that the friction member is engaged with the surface of the auxiliary gear 13 or by increasing the friction coefficient between the friction member and the auxiliary gear 13. The friction coefficient can be increased by manufacturing the friction member from a high friction material or by providing a textured surface on the friction member that is configured to engage with the surface of the auxiliary gear 13. In one embodiment (not shown), the rotatable assembly further comprises a second friction member that is integrally formed with or adhered to the surface of the auxiliary gear 13 and is configured to engage with the friction member.

In another embodiment the passive retardation device comprising a stepper motor 15 having a detent torque that prevents the load gear 11 from rotating under external forces is omitted and is replaced with an alternative passive retardation device comprising an eddy-current brake. The eddy-current brake is coupled to the auxiliary gear 13 to inhibit rotational movement of the auxiliary gear 13. When an external force is exerted on the load gear 11 to urge it to rotate in the first rotational direction, a tooth 16 of the load gear 11 is urged against a tooth 18 of the auxiliary gear 13 so that the auxiliary gear 13 is urged to rotate in the second rotational direction. However, the eddy-current brake resists rotation of the auxiliary gear 13 and so the load gear 11 is prevented from rotating in the first rotational direction when the external force applied thereto, and so the holding torque of the rotatable assembly is increased.

In the above described embodiment, the first stepper motor 14 is powered to drive the load gear 11 in a first rotational direction and the second stepper motor 15 is unpowered to provide a detent torque so that the effect of backlash is reduced when an external force is applied to the load gear 11 in the first rotational direction. In an alternate configuration of the first embodiment, the load gear 11 may be rotated in a second rotational direction by powering the second stepper motor 15. In such an embodiment, when it is desired to rotate the load gear 11 in the first rotational direction the first stepper motor 14 is powered so the rotor 21 moves between the holding positions in the second rotational direction in the manner previously described, and the second stepper motor 15 is unpowered and has detent positions that are offset from the first stepper motor 14 holding positions by an offset angle so that the detent torque of the second stepper motor 15 acts on the load gear 11 in the second rotational direction to reduce backlash. To rotate the load gear 11 in the second rotational direction, the first stepper motor 14 is unpowered and the second stepper motor 15 is driven in the first rotational direction so that the auxiliary gear 13 drives the load gear 11. In such a circumstance, the rotor 31 of the second stepper motor 15 is moved sequentially through holding positions and, meanwhile, the rotor 21 of the first stepper motor 14 is offset from its detent positions by an offset angle. The offset angle of the rotor 21 of the first stepper motor 14 is equal to the offset angle of the rotor 31 of the second stepper motor 15, but is in the opposite rotational direction. The detent torque of the unpowered first stepper motor 14 acts on the load gear 11 in the first rotational direction to reduce the effect of backlash when an external force is applied to the load gear 11 in the second rotational direction. In such an arrangement, the first stepper motor 14 acts as a passive rotational retardation device since it provides detent torque against the rotational force provided by the second stepper motor 15 without being powered itself.

Referring to FIGS. 7-11D, a rotatable assembly 100 of a second embodiment of the invention is shown and comprises a load gear 110 that engages first and second drive gears 120, 121 and first and second auxiliary gears 130, 131. The load, drive and auxiliary gears 110, 120, 121, 130, 131 are rotatable in a first rotational direction (shown by arrow 'X' in FIG. 11) and a second rotational direction (shown by arrow 'Y' in FIG. 11). The load gear 110 is coupled to a harmonic gear (not shown) that is coupled to a load and the first and second drive gears 120, 121 are coupled to first and second stepper motors 140, 141 respectively.

The load gear 110 has a plurality of load teeth 160 that each has a first surface 160A that faces in the first rotational direction and a second surface 160B that faces in the second rotational direction. Similarly, the first and second drive gears 120, 121 each comprise a plurality of drive teeth 170, 171 that each has a first surface 170A, 171A that faces in the first rotational direction and a second surface 170B, 171B that faces in the second rotational direction and each auxiliary gear 130, 131 comprises a plurality of auxiliary teeth 180, 181 that each has a first surface 180A, 181A that faces in the first rotational direction and a second surface 180B, 181B that faces in the second rotational direction.

As with the first stepper motor 15 of the first embodiment of the invention, the first and second stepper motors 140, 141 of the second embodiment each has a stator (not shown) that is arranged around the rotational axis of a permanent magnet rotor comprising a north pole and a south pole (not shown). Additionally, the first and second stepper motors 140, 141 each comprise eight windings (not shown) that are diametrically arranged around the rotor to comprise four pole pairs, and each rotor is rotatable between eight holding positions. The first and second stepper motors 140, 141 are configured so that when the rotor of the first stepper motor 140 is in a holding position, with a tooth 170 of the first drive gear 120 abutting a tooth 160 of the load gear 110, the second stepper motor 140 will also be in a holding position, with a tooth 171 of the second drive gear 121 abutting a tooth 160 of the load gear 110.

To drive the load gear 110 in the first rotational direction, the first stepper motor 140 is powered so that its rotor is rotated sequentially between pole pairs in the second rotational direction to drive the first drive gear 120, in the same manner as described in the first embodiment of the invention, and the second stepper motor 141 is unpowered. The second surface 170B of a tooth 170 of the first drive gear 120 will be urged against a second surface 160B of a tooth 160 of the load gear 110, causing the load gear 110 to rotate in the first rotational direction. Conversely, to drive the load gear 110 in the second rotational direction, the second stepper motor 141 is powered so that its rotor is rotated sequentially between pole pairs in the first rotational direction to drive the second drive gear 121 and the second stepper motor 141 is unpowered. The first surface 171A of a tooth 171 of the second drive gear 121 will be urged against a first surface 160A of a tooth 160 of the load gear 110, causing the load gear 110 to rotate in the second rotational direction.

To reduce the effects of backlash, the first and second auxiliary gears 130, 131 are coupled to third and fourth stepper motors 150, 151 respectively, to act, when unpowered, as first and second passive retardation devices respectively. As with the second stepper motor 13 of the first embodiment of the invention, the third and fourth stepper motors 150, 151 of the second embodiment each comprise a stator (not shown) that is arranged around the rotational axis of a permanent magnet rotor that has a north pole and a south pole (not shown). Additionally, the third and fourth stepper motors 150, 151 each comprise eight windings (not shown) that are diametrically arranged around the rotor to comprise four pole pairs, and each rotor has eight detent positions wherein the north and south poles of the rotor are proximate to corresponding windings of a pole pair. The magnetic poles of the rotor of each of the third and fourth stepper motors 150, 151 are magnetically attracted to the ferromagnetic material of the windings of the nearest pole pair, which results in a detent torque acting on each rotor to urge it into its nearest detent position.

The rotor of the third stepper motor 150 is rotationally offset from the rotor of the first stepper motor 140 by an offset angle of 4.5 degrees in the second rotational direction so that when the rotor of the first stepper motor 140 is in one of its holding positions, the rotor of the third stepper motor 150 will be offset from its nearest detent position by 4.5 degrees and urged towards its closest detent position by the detent torque acting on the rotor. The detent torque of the third stepper motor iso, which acts on the first auxiliary gear 130 in the first rotational direction, will urge the load gear 110 in the second rotational direction so that the engaged tooth 160 of the load gear 11 is urged against the engaged tooth 170 of the first drive gear 120. Therefore, when the first stepper motor 140 is in a holding position, the load gear 110 is prevented from rotating in the first rotational direction under external forces, which could otherwise result in the engaged teeth 160, 170 becoming disengaged, and so the effect of backlash between the load gear 110 and first drive gear 120 is reduced. As the teeth 160, 170 are kept engaged, a torque can more instantaneously be applied to the load gear 110 by the first drive gear 120, and the rotational position of the load gear 110 is better known. Furthermore, the holding torque of the system is improved.

The rotor of the fourth stepper motor 151 is rotationally offset from the rotor of the second stepper motor 141 by an offset angle of 4.5 degrees in the first rotational direction. Therefore, when the rotor of the second stepper motor 141 is in one of its holding positions, the rotor of the fourth stepper motor 151 will be offset from its nearest detent position by 4.5 degrees and urged towards its closest detent position by the detent torque acting on the rotor. The detent torque of the fourth stepper motor 151, which acts on the second auxiliary gear 131 in the second rotational direction, will urge the load gear 110 in the first rotational direction so that the engaged tooth 160 of the load gear 110 is urged against the engaged tooth 171 of the second drive gear 121. Therefore, when the second stepper motor 141 is in a holding position, the load gear 110 is prevented from rotating in the second rotational direction under external forces, which could otherwise result in the engaged teeth 160, 171 becoming disengaged, and so the effect of backlash between the load gear 110 and first drive gear 121 is reduced in the second rotational direction. As the teeth 160, 171 are kept engaged, a torque can more instantaneously be applied to the load gear 110 by the second drive gear 121, and the rotational position of the load gear 110 is better known. Furthermore, the holding torque of the system is improved.

The rotatable apparatus 100 of the second embodiment of the invention further comprises third and fourth auxiliary gears 132, 133 that each engage with the load gear 110. The third and fourth auxiliary gears 132, 133 are coupled to fifth and sixth stepper motors 152, 153 respectively. The fifth and sixth stepper motors 152, 153 are configured to drive the corresponding auxiliary gears 132, 133 in first and second rotational directions respectively. The fifth and sixth stepper motors 152, 153 are similar in construction to the first and second stepper motors 140, 141, having the same rotor/stator configurations and holding positions, and provide a reserve means of driving the load gear in case the first and/or second stepper motors 140, 141 fail. This high level of redundancy may be particularly useful in applications where it is difficult.

The rotatable assembly 100 comprises a frame 154 having a plurality of mounting points 155 for mounting the stepper motors and passive retardation devices 140, 141, 150, 151, 152, 153 to the frame 154. Each of the stepper motors and passive retardation devices comprises an end plate 156 that comprises a set of bolt holes 157. Each mounting point 155 of the frame 154 comprises a set of bolt holes 158 that are configured to align with the set of bolt holes 157 of a stepper motor or passive retardation device 140, 141, 150, 151, 152, 153 when the rotatable assembly 100 is assembled. A bolt (not shown) is then threaded through each of the aligned bolt holes 157, 158 and fastened at a free end by a nut (not shown) to secure the stepper motor or passive retardation device to the frame 154. This arrangement allows for a modular system with each stepper motor and/or passive retardation device 140, 141, 150, 151, 152, 153 being removable from the rotatable assembly 100 simply by removing the bolts thereof without having to disassemble the other parts of the rotatable assembly 100. This can be particularly advantageous in situations wherein each component of the rotatable assembly 100 must be tested and certified before use, for example, in space applications, as if the components of the rotatable assembly are tested and certified and then it is decided that one of the stepper motors or passive retardation devices are to be replaced, the new component may be swapped in and tested without re-testing and re-certifying the other components of the rotatable assembly 100. Furthermore, the spacing between bolt holes 157, 158 of the sets of bolt holes 157, 158 can be standardised to facilitate different stepper motors and passive retardation devices 140, 141, 150, 151, 152, 153 being interchanged. For example, the spacing and size of the bolt holes 158 of the mounting point 155 for coupling the third stepper motor 150 to the first auxiliary gear 130 may be standardised and the spacing and size of the bolt holes 157 of the third stepper motor 150 and alternative passive retardation devices, such as, a friction mechanisms, an eddy-current brake or a stepper motor with a different magnitude of detent torque, may be standardised. This would allow the third stepper motor 150 to be easily swapped with one of the alternative passive retardation devices, simply by unfastening the bolts to remove the third stepper motor 150 and then aligning the bolt holes 157 of the alternative passive retardation device with the bolt holes 158 of the mounting point 155 and then securing the alternative passive retardation device with the bolts. The first auxiliary gear 130 may then be coupled to the alternative passive retardation device or alternatively, the first auxiliary gear 130 may be replaced with an alternative first auxiliary gear (not shown) when the passive retardation device is replaced.

Although in the above described embodiment the fifth and/or sixth stepper motors 152, 153 are only used to drive the load gear 110 when the first and/or second stepper motors 140, 141 malfunction, to provide redundancy so that the rotatable assembly 100 may still be operated to drive the load gear 110, in an alternate embodiment the first and fifth stepper motors 140, 152 are powered simultaneously to drive the load gear 110 in the first rotational direction and the second and sixth stepper motors 141, 153 are powered simultaneously to drive the load gear 110 in the second rotational direction. Such an embodiment may provide a more even force applied to the load gear 110 and would require smaller motors to drive the load gear 110 with the same amount of torque. In one embodiment, if one of the stepper motors that drives the load gear 110 malfunctions, the power is increased to one or more of the remaining stepper motors so that the load gear 110 is driven with a similar amount of torque to when all of the stepper motors are functional. In yet another embodiment, the fifth and sixth stepper motors 152, 153 have rotors that are offset from their detent positions in opposite rotational directions to provide additional detent torque to that provided by the third and fourth stepper motors 150, 151, so that the effect of backlash due to larger external forces applied to the load gear 110 is reduced. In yet another embodiment, the third and fourth auxiliary gears 132, 133 and the fifth and sixth stepper motors 152, 153 are omitted. The multiple stepper motors in the assembly provide the additional benefit of accumulated detent torque from the plurality of unpowered stepper motors providing increased force to retain the load gear 110 (and thereby the device/instruments coupled thereto) accurately in the intended position.

Although in the above described embodiments the first and second drive gears 120, 121 and the third and fourth auxiliary gears 132, 133 are coupled to stepper motors 140, 141, 152, 153, in alternate embodiments one or more of the drive and/or auxiliary gears are coupled to a different type of motor that comprises a rotor that is rotatable in a number of discrete steps between discrete positions, for example, a servo motor. In such embodiments, each of the discrete steps of the rotor comprises a holding position. Although in the above described embodiments the load gear 11, 110 is driven by one or two, or four stepper motors and detent torque is provided by one, two or four stepper motors, in alternate embodiments other numbers and combinations of stepper motors for driving the load gear and stepper motors for providing detent torque are possible.

In one embodiment (not shown), one or more of the stepper motors is a hybrid stepper motor.

In the embodiments described above, a positional sensor may be connected to the driven load gear 11/110 to measure net rotation provided by the motor(s) and to provide feedback to a controller operable to control the motor(s) and supply of power thereto.

Although in the above described embodiments the gears are spur gears, in alternate embodiments (now shown) the gear teeth may be other shapes, for example, helical or herringbone shaped.

Throughout the above description, various embodiments of passive retardation device are described which are configured to offer rotational resistance against a rotational driving force. That is, the devices are passive in that they can operate as rotational retardation devices without being powered, electrically or otherwise, or without the need to be actively controlled by electronics or otherwise, to perform the rotational retardation function.

The invention claimed is:

1. A rotatable gear assembly for use in a space craft for control of a moveable component thereof, the assembly comprising:
    a load gear in engagement with a drive gear and with an auxiliary gear,
    wherein the drive gear is coupled to a drive motor so as to drive the load gear in a first rotational direction;
    wherein the auxiliary gear is coupled to a retardation device that is configured to passively resist the load gear from rotating in the first rotational direction;
    wherein the drive motor comprises a drive rotor that is incrementally rotatable between a plurality of discrete positions and the retardation device comprises a stepper motor that has a stepper rotor that is rotatable between a plurality of discrete detent positions, and wherein when the drive rotor is in a discrete position the stepper rotor is offset from its nearest detent position; and
    wherein the rotatable gear assembly further comprises a controller to control operation of the drive motor and the stepper motor, the controller being configured to control the stepper motor to be in an unpowered state when the drive motor is powered to drive the load gear.

2. A rotatable assembly according to claim 1, wherein the drive gear and the load gear respectively have teeth in meshing engagement, and the load gear and the auxiliary gear have teeth in meshing engagement, and wherein the rotatable assembly is configured such that when the drive motor is in a discrete position, the load gear is held stationary by the teeth of the drive gear and load gear in said meshing engagement abutting to exert a force on the load gear in one direction, and the teeth of the auxiliary gear and the load gear in said meshing engagement abutting to exert a force on the load gear in an opposite direction.

3. A rotatable assembly according to claim 1, wherein the stepper motor is configured to generate a detent torque that urges the load gear in a second rotational direction opposite to the first rotational direction when the drive rotor is in a discrete position.

4. A rotatable assembly according to claim 3, wherein when the drive rotor is in a discrete position the stepper rotor is offset from its nearest offset position by an offset angle in the second rotational direction.

5. A rotatable assembly according to claim 4, wherein the offset angle is between o percent and 50 percent of the angle between adjacent discrete positions of the drive rotor.

6. A rotatable assembly according to claim 1, wherein backlash is provided between the drive and load gears and comprises an angle by which the load gear can rotate without corresponding movement of the drive gear, and wherein an angle between adjacent discrete positions of the drive rotor is greater than the angle of the backlash.

7. A rotatable assembly according to claim 1, wherein the stepper motor is configured to be in an unpowered state when the drive motor drives the load gear.

8. A rotatable assembly according to claim 1, wherein the drive motor is a first stepper motor and the retardation device is a second stepper motor, wherein the assembly is configured such that the second stepper motor is unpowered and provides detent torque on the load gear in a second, opposite direction when the first stepper motor drives the load gear in the first direction, and wherein the second stepper motor can be powered to drive the load gear in the second direction whilst the first stepper motor is unpowered and provides detent torque on the load gear in the first direction.

9. A rotatable assembly according to claim 1, comprising a second drive gear and a second auxiliary gear that each engage with the load gear, wherein the second drive gear is coupled to a second drive motor that is configured to rotate the drive gear in a second rotational direction opposite the first rotational direction and the second auxiliary gear is coupled to a second retardation device that is configured to passively resist the load gear from rotating in said opposing rotational direction.

10. A rotatable assembly according to claim 9, wherein the second drive motor comprises a second drive rotor that is rotatable in the second rotational direction between a plurality of discrete positions and the second retardation device comprises a second stepper motor that has a second stepper rotor that is rotatable between a plurality of discrete detent positions, and wherein when the second drive rotor is in a discrete position the second stepper rotor is offset from its nearest detent position.

11. A rotatable assembly according to claim 10, further comprising third and fourth auxiliary gears that are coupled to third and fourth stepper motors respectively that comprise third and fourth stepper rotors that are rotatable between a plurality of detent positions and wherein the third and fourth stepper rotors are offset from their respective detent positions when the first and second drive rotors are each in a discrete position.

12. A space craft structure comprising a moveable component coupled to, and controlled by a rotatable assembly according to claim 1.

* * * * *